United States Patent
Kuchler

(10) Patent No.: US 7,532,957 B2
(45) Date of Patent: May 12, 2009

(54) METHOD AND APPARATUS FOR CONTROLLING THE OPERATION OF WHEEL ELECTRONICS ASSOCIATED WITH A VEHICLE WHEEL

(75) Inventor: Gregor Kuchler, Thalmassing (DE)

(73) Assignee: Siemens Aktiengesellschaft, Munich (DE)

( * ) Notice: Subject to any disclaimer, the term of this patent is extended or adjusted under 35 U.S.C. 154(b) by 341 days.

(21) Appl. No.: 10/578,963

(22) PCT Filed: May 24, 2005

(86) PCT No.: PCT/EP2005/052364

§ 371 (c)(1), (2), (4) Date: May 10, 2006

(87) PCT Pub. No.: WO2005/115771

PCT Pub. Date: Dec. 8, 2005

(65) Prior Publication Data

US 2007/0069879 A1 Mar. 29, 2007

(30) Foreign Application Priority Data

May 27, 2004 (DE) .................. 10 2004 026 035

(51) Int. Cl.
*G05D 1/00* (2006.01)

(52) U.S. Cl. ................ 701/1; 701/36; 340/447

(58) Field of Classification Search ............... 701/1, 701/29, 36; 340/442, 447
See application file for complete search history.

(56) References Cited

U.S. PATENT DOCUMENTS

| 5,741,966 | A | 4/1998 | Handfield et al. |
| 5,889,464 | A | 3/1999 | Huang |
| 6,445,286 | B1 | 9/2002 | Kessler et al. |
| 6,538,566 | B1 * | 3/2003 | Morand et al. ............. 340/444 |
| 6,580,364 | B1 | 6/2003 | Munch et al. |
| 6,725,713 | B2 | 4/2004 | Adamson et al. |
| 6,906,624 | B2 * | 6/2005 | McClelland et al. ........ 340/442 |
| 6,970,076 | B1 * | 11/2005 | Starkey ...................... 340/445 |

(Continued)

FOREIGN PATENT DOCUMENTS

DE 19856860 A1 6/2000

(Continued)

OTHER PUBLICATIONS

German Office Action dated Jun. 5, 2008.

*Primary Examiner*—Gertrude Arthur Jeanglaud
(74) *Attorney, Agent, or Firm*—Laurence A. Greenberg; Werner H. Stemer; Ralph E. Locher

(57) ABSTRACT

A device and a method control the operation of an electronic wheel unit that is allocated to a vehicle wheel. The method includes recording data relating to the operating conditions of the wheel using at least one condition recording unit and/or recording data relating to the energy that is currently available to the electronic wheel unit from a generator and/or an energy accumulator device using at least one energy recording unit. The operation of the electronic wheel unit and the defined energy consumption of the electronic wheel unit is controlled in accordance with the data that has been recorded by the condition recording unit and/or the energy recording unit using a central control unit that is connected to the condition recording unit and/or the energy recording unit.

24 Claims, 2 Drawing Sheets

U.S. PATENT DOCUMENTS

| | | |
|---|---|---|
| 7,042,348 B2 | 5/2006 | Schulze et al. |
| 2002/0044050 A1 | 4/2002 | Derbyshire et al. |
| 2002/0121132 A1 | 9/2002 | Breed et al. |
| 2004/0007302 A1 | 1/2004 | Hamilton et al. |

FOREIGN PATENT DOCUMENTS

| | | | |
|---|---|---|---|
| DE | 10217239 A1 | 7/2003 | |
| WO | 03095245 A1 | 11/2003 | |
| WO | 2004030950 A1 | 4/2004 | |
| WO | WO 2004/030948 A1 | 4/2004 | |

\* cited by examiner

METHOD AND APPARATUS FOR CONTROLLING THE OPERATION OF WHEEL ELECTRONICS ASSOCIATED WITH A VEHICLE WHEEL

BACKGROUND OF THE INVENTION

Field of the Invention

The present invention relates to a method and an apparatus for controlling the operation of wheel electronics associated with a wheel of a vehicle, in particular for optimum utilization of the energy reservoir present or more precisely utilization matched to the driving condition.

Although applicable to any vehicles having one or more tires, the present invention and the problems it seeks to address will be explained in relation to a passenger motor vehicle.

Active and passive safety systems in the motor vehicle field are playing an increasingly greater role in the ongoing development of vehicles. Customer expectations require both performance and convenience, oriented to ever greater safety for the vehicle occupants.

In addition to the passive and active safety systems such as airbags, collision protection and seat belt pretensioners, active driving safety with its ever growing possibilities is becoming increasingly important, the development objective being a control system that rapidly detects the instantaneous driving situation and can immediately intervene actively in any critical situation or supply the driver with an appropriate signal for manual adjustment of the driving situation.

For example, the tire pressure can be monitored whereby in the event of critical tire pressure values the control system can indicate this defect to the driver who is then able to take appropriate action. With tire pressure monitoring systems it is necessary to incorporate sensors inside the tire which detect e.g. the pressure, the temperature, accelerations and possibly other measurands and communicate them to the vehicle's fixed central processing unit.

For the safe and also economical operation of a motor vehicle, knowledge of particular tire parameters is of fundamental importance. In particular, a flat or underinflated tire constitutes a considerable safety risk given the requirements for today's motor vehicles, it being precisely the positive per se "run-flat" properties of modern vehicle tires that mean that a motor vehicle driver is no longer able simply to detect a tire defect of the abovementioned type directly. A stable drive at up to 80 km/h is thus possible with a flat tire and no appreciable loss of comfort, without the driver becoming aware of this defect condition either audibly or due to significantly altered behavior of the vehicle. At a higher speed, a tire of this kind will then abruptly behave uncontrollably.

A vehicle with a flat tire may therefore behave reliably while driving through a town or village, but immediately after joining a freeway it will then, as its speed increases, get out of the driver's control without any warning having been given.

Other problems can arise due to unbalance, incorrect adjustment of camber and tracking on a wheel or due to defects of an internal tire structure. These defects also can rapidly inflict serious tire damage, in particular they are liable to cause the vehicle to get out of control in an emergency situation, e.g. in the event of full braking at high speed on a freeway.

Known from the prior art are wheel-mounted electronics which can be mounted both on the wheel rim and on the tire, e.g. for monitoring the tire pressure by means of sensor devices, the road condition or the wheel load in the tire. The wheel-mounted electronics require electrical energy to perform their functions.

All the components can feed into a tire information system as part of a comprehensive driver assistance system. Two fundamentally different approaches for tire information systems have evolved: battery-backed and battery-less systems. Because of the extreme service conditions of a tire, signal transmission by radio or more precisely electromagnetic wave has generally supplanted electromechanical transmission methods.

Battery-backed systems have the advantage that energy is supplied by a battery both for measuring the tire parameters, e.g. pressure, and for subsequent radio transmission of the information to the vehicle. The vehicle architecture required for this purpose takes up little additional space: four sets of tire electronics and a central radio receiver with associated signal processing suffice.

However, battery-backed tire information systems have major disadvantages: a battery provided inside a tire additionally constitutes an unbalance which has to be compensated with corresponding cost. Moreover, tires have very high endurance, particularly in the case of trucks, i.e. these tires have extremely long service lives, and so a battery must have an extremely long lifetime in order to be able to ensure the required functionality over the entire operating time. In addition to a long service life, such a battery must also be able to operate reliably across a wide temperature range. An output voltage of conventional batteries would fluctuate quite considerably between the values for winter use and those of long-term use at high-summer outdoor temperatures. This and other requirements currently result in expensive and correspondingly bulky designs.

In the past, various battery-less systems have therefore been proposed which are based on the following functional principles:

a) The tire electronics are supplied by an electromagnetic field with energy which is used both for measuring the tire parameters and for information transmission. In general this approach requires four decentrally disposed antennas which are mounted in the region of the wheel housings in order to provide a sufficient field strength. Compared to the above-described battery-backed systems, this means a considerable additional cost in and on a particular vehicle.

b) Kinetic energy provided by the motion of the tire electronics in the tire is used e.g. with the aid of a piezo generator or a mechanical generator to supply the electronics, similarly to a self-winding watch, for example.

In general, battery-less systems have the advantage compared to battery-backed systems of a virtually unlimited service life and of being maintenance-free. They are therefore selected as the point of departure for a development according to the invention.

The advantage of an approach according to b) is that during vehicle operation a sufficient amount of energy and therefore transmission energy is continuously provided for transmitting the tire information to a central receiver. One central radio receiver in a vehicle therefore suffices, as is also the case with the battery-backed systems.

In the prior art there is specifically to be found the approach of a battery-less concept wherein the necessary electrical energy is transferred contactlessly or by means of a transduction element for converting mechanical energy into electrical energy. This energy is provided on a battery-less basis inter alia from the conversion of mechanical deformation energy from the flexing, the vibrations, the tire oscillations or the like, into electrical energy. Piezoelectric elements, for example, which are incorporated outside the tire or planarly in the tires, are used as transduction elements.

In the prior art, as already explained above, generators and intermediate energy storage devices are generally connected directly to the ultimate load, i.e. in this case the electronic wheel unit. However, this approach has been found to be disadvantageous in that the operational readiness of the electronic wheel unit depends on the available energy of the generator or the characteristics of the interposed energy storage device. Operational readiness in particular situations is not selectively aimed at. However, in the case of tire pressure control systems, for example, certain driving conditions require increased operational readiness of the electronic wheel unit. Examples of this include initialization and localization phases of the relevant wheel during the start of vehicle operation. According to the prior art, during the start of vehicle operation, because of the low speeds prevailing and the associated low available energy, the generator-supplied wheel units in most cases lack the necessary energy to transmit a radio telegram preferably with an increased frequency, e.g. signals at 15 second intervals instead of at 60 second intervals.

Another example of increased operational readiness of the electronic wheel unit is constituted by driving conditions at high vehicle speeds for which the increased safety risk requires an increased transmission frequency. A disadvantage of this approach according to the prior art is that, in particular driving conditions of the vehicle, limited availability of the energy-supplying generator or of the intermediate storage device may occur and reliable operation of the electronic wheel units is not guaranteed. Consequently, to ensure reliable operation of the electronic wheel unit in particular driving conditions an additional auxiliary battery would have to be provided, resulting in additional costs.

SUMMARY OF THE INVENTION

The object of the present invention is therefore to specify a method and an apparatus by means of which the electronic wheel unit is provided with sufficient energy in a simple and cost-effective manner even in particular driving conditions of the vehicle to ensure reliable operation in all driving conditions.

This object is achieved according to the invention in respect of method by the method having the features set forth in claim 1 and in respect of apparatus by the apparatus having the features set forth in claim 15.

The basic idea of the present invention is that there are provided at least one state detection device for acquiring data relating to the operating state of the wheel and/or at least one energy detection device for acquiring data relating to the energy instantaneously available to the wheel electronics from a generator and/or an energy storage device. The operation of the wheel electronics and therefore the thereby determined energy consumption is controlled in a suitable manner as a function of the acquired data of the at least one state detection device and/or of the at least one energy detection device by means of a central control unit connected to the at least one state detection device and/or the at least one energy detection device. This enables the electronic control unit to be operated in a mode having a low energy consumption during less critical operating states of the wheel, whereby the interposed energy storage device can regenerate or recharge itself if necessary. On the other hand, in a critical operating state of the wheel, the electronic wheel unit can be operated in a mode having a higher energy consumption for transmitting data signals with e.g. an increased transmission frequency, repetition rate, repetition frequency or the like compared to normal operation, it being possible to use e.g. the energy pre-stored in the energy storage device.

The present invention therefore has the advantage compared to the approaches according to the prior art that the central control unit detects the instantaneous operating state of the wheel and/or the energy instantaneously available to the electronic control unit and selectively controls the behavior of the electronic wheel unit as a function of the overall situation in order to ensure operation which also, at least temporarily, consumes more energy than is available from the generator during particularly important operating states. This ensures a situation-dependent response of the electronic wheel unit which cancels out the disadvantage of limited availability of known generators on one hand and the necessity for an auxiliary battery on the other. The thus increased operational readiness of the electronic wheel unit, e.g. in the initial phase of driving, in particular allows reliable localization and initialization, initialization being specifically to be understood as follows. This function solves the problem that the vehicle must be able to automatically differentiate between the wheel electronics associated with it and external wheel electronics that may likewise be received. The reason behind this is the possibility that new—for the moment unknown—wheel electronics could have been installed by the driver/mechanic. The system is supposed to be automatically capable of learning new wheel electronics of this kind. Typical solutions analyze the frequency with which the wheel electronics identifiers are received by the vehicle receiver during a defined time after moving off. The associated functionality is more stable and converges quicker the more frequently telegrams are transmitted especially during the first minutes after moving off.

Localization, on the other hand, is specifically to be understood as follows. Even position inversions are to be automatically detected, various analyses being performed, such as the change in acceleration when cornering, the receive field strengths in absolute terms or relative to the driving situation, the direction of rotation of the wheels, etc. As in the case of initialization, the various processes generally converge more rapidly the more frequently the wheel electronics transmit after the vehicle has moved off. Once again the system gains functionality through increased operational readiness.

Advantageous embodiments and developments of the invention are the subject matter of the further dependent claims and of the description which refers to the accompanying drawings.

According to a preferred development, the electronic wheel unit is directly connected to the energy storage device for supplying energy, the energy storage device preferably being provided between the generator and the electronic wheel unit. The energy storage device is advantageously implemented with charging electronics for suitable conversion and conditioning of the signals received from the generator. For example, the energy storage device is implemented as a rechargeable battery, capacitor, gold cap capacitor, a foil battery incorporated in a circuit board, or similar. Other designs for an energy storage device are obviously possible.

According to another preferred development, there are provided a plurality of state detection devices for recording e.g. acceleration data, vibration data, noise data, forces, movements, temperature data, pressure data, etc. The central control unit is connected to all the state detection devices and can analyze and condition individual received signals or any combination of signals. The central control unit evaluates, for example, the overall situation recorded by the individual signals for suitable control action. Other operating states can be e.g. state changes selectively introduced from outside. For example, electrical, magnetic or electromagnetic signals can be sensed which are produced by a vehicle's fixed transmitter in order to signal the operating state of the wheel.

According to another preferred embodiment, there are provided a plurality of energy detection devices for detecting the instantaneously available energy of the generator and the instantaneous utilization state of the energy storage device. The energy detection devices are preferably implemented as sensors which are operated completely passively, i.e. for which any change in the state variable itself generates the necessary operating energy to indicate this change to the central control unit via the sensor. Examples of such sensors and piezoelectric elements for detecting mechanical deformations, pickup coils for detecting electromagnetic signals by means of induction, pyroelectric elements or thermopile devices for detecting temperature changes or the like.

The central control unit preferably analyzes the data received from the state detection devices and/or the energy detection devices in respect of the following operating states: start of driving, e.g. a predetermined time interval after moving off; wheel initialization, whereby an initialization procedure is executed e.g. on the vehicle receiver; wheel localization, whereby a localization procedure is executed on the vehicle receiver; risk area, e.g. for below-threshold pressure and/or above-threshold speed; danger area, e.g. for greatly below-threshold pressure; charging area, e.g. for high available energy at the generator output and/or low fill level of the energy storage device; discharging area, e.g. for low available energy at the generator output and/or high fill level of the energy storage device; or the like.

According to another preferred embodiment, the central control unit controls the following responses of the electronic wheel unit as a function of the data acquired: the transmission frequency, the measurement frequency, the accuracy of the measurements, the transition to or from a power saving mode of the wheel electronics or the like; the repetition frequency of a radio telegram to improve transmission reliability; which measurements are to be performed by the electronic wheel unit; the connection of the electronic wheel unit to the energy storage device; adaptation or selection of the transmitted data, e.g. the telegram is reduced to the most necessary core data for energy saving (only identifiers and possibly additional pressure and temperature data), whereas without the need to save energy all the sensor data together with calibration the manufacturing data is transmitted; or the like.

In particular, during particularly important operating states, the central control unit guarantees operation which at least temporarily consumes more energy than is instantaneously available from the generator and/or the energy storage device. On the other hand, during less important operating states the central control unit advantageously reduces the functionality below the degree available in terms of the available energy of the generator in order to top up the energy storage device to compensate for the energy previously over-consumed or to be over-consumed. This means that also in important driving conditions such as at the start of vehicle operation, reliable functioning of the electronic wheel unit is guaranteed.

The invention will now be explained in greater detail with reference to the embodiments schematically illustrated in the Figures of the accompanying drawings in which:

DESCRIPTION OF THE PREFERRED EMBODIMENTS

Figure 1:
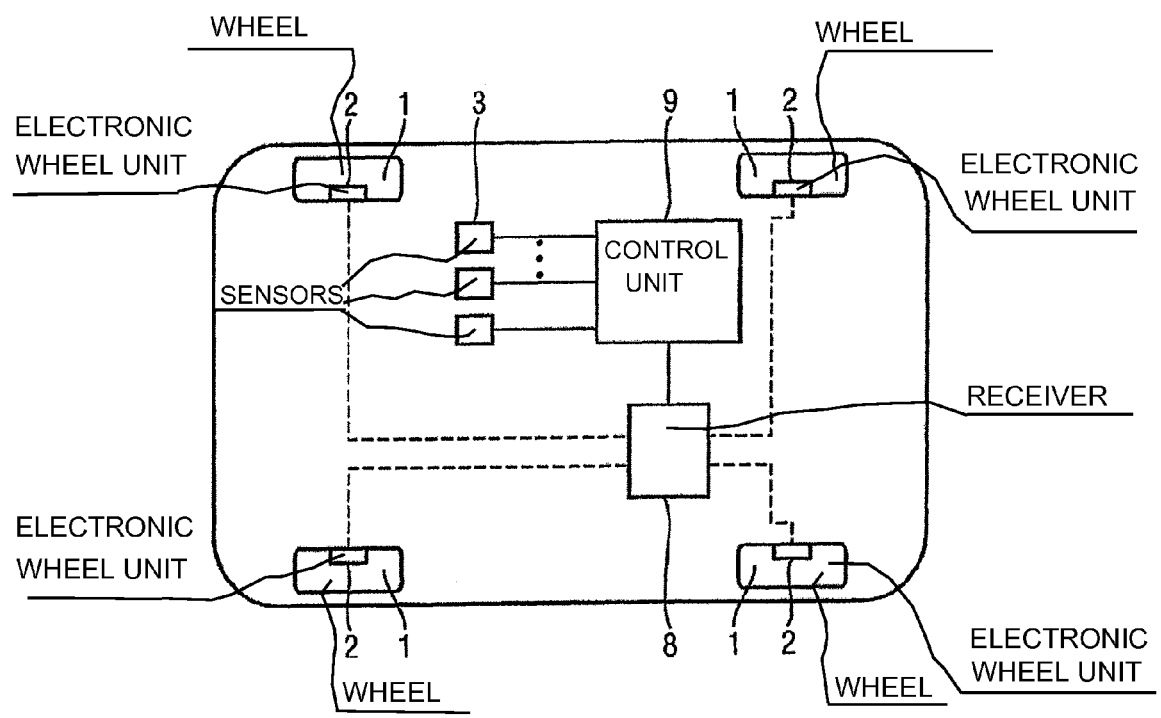
FIG. 1 schematically illustrates an apparatus incorporated in a wheeled vehicle according to one embodiment of the present invention.

In the Figures, unless otherwise stated, the same or functionally identical components have been provided with the same reference numerals.

FIG. 1 schematically illustrates an apparatus provided in a vehicle for controlling the operation of an electronic wheel unit 2 assigned to a wheel 1 according to a preferred embodiment of the present invention.

As shown in FIG. 1, each vehicle wheel 1 preferably has an assigned electronic wheel unit 2 which is mounted e.g. in the tire or internal rim surface or rim edge. The present invention will now be explained in greater detail with reference to a wheel 1 with assigned electronic wheel unit 2, the present invention obviously being applicable analogously to all the wheels.

Measured wheel state variables are transmitted by the electronic wheel unit 2 from same to a central control unit 9 e.g. by means of a radio link and a superordinate radio receiver 8 which is directly connected to the control unit 9. The central control unit 9, as likewise shown in FIG. 1, is connected to preferably a plurality of sensors 3 which sense different operating states of the wheel 1.

Said sensors 3 can be implemented either as sensors separately provided in the motor vehicle or as sensors incorporated in the electronic wheel unit 2 or directly connected to same. Advantageously, the sensors 3 provided are used simultaneously e.g. for the recording of the pressure, temperature, acceleration or the like of the wheel 1 by the central control unit 9 and by the electronic wheel unit 2.

The sensors 3 thus sense variables which provide indications of the instantaneous operating state of the wheel 1. Such measured variables can be, for example, vibrations, noise, forces, movements, temperatures, pressures or other state variables of the wheel 1.

In addition, state changes selectively introduced from outside can also be detected by means of the sensors 3 and acquired data transmitted to the central control unit. For example, electrical, magnetic or electromagnetic signals emitted by a fixed transmitter in the vehicle can be detected by the sensors 3 in order to signal the instantaneous operating state of the wheel 1.

The apparatus according to the present embodiment additionally has one or more energy detection devices 4, 4' which will be explained in greater detail with reference to FIG. 2. The energy detection devices 4, 4' detect the instantaneously available energy of a generator 5 supplying the wheel unit and the instantaneous fill level or the instantaneous utilization state of an energy storage device 6 connected between the electronic wheel unit 2 and the generator 5.

The generator 5 can be any kind of energy transducer which e.g. converts mechanical energy into electrical energy.

An example of such a generator is contained in patent application U.S. Pat. No. 5,741,966.

The sensors 3 or the energy detection devices 4, 4' are preferably implemented as completely passively operating devices so that any change in a state variable to be detected itself generates the energy to transmit this change in the state variable to the central control unit via the corresponding sensor or corresponding device. For example, the sensors can be implemented as piezoelectric elements for detecting mechanical deformations, as pickup coils for detecting electromagnetic signals by means of induction, or the like.

Figure 2:
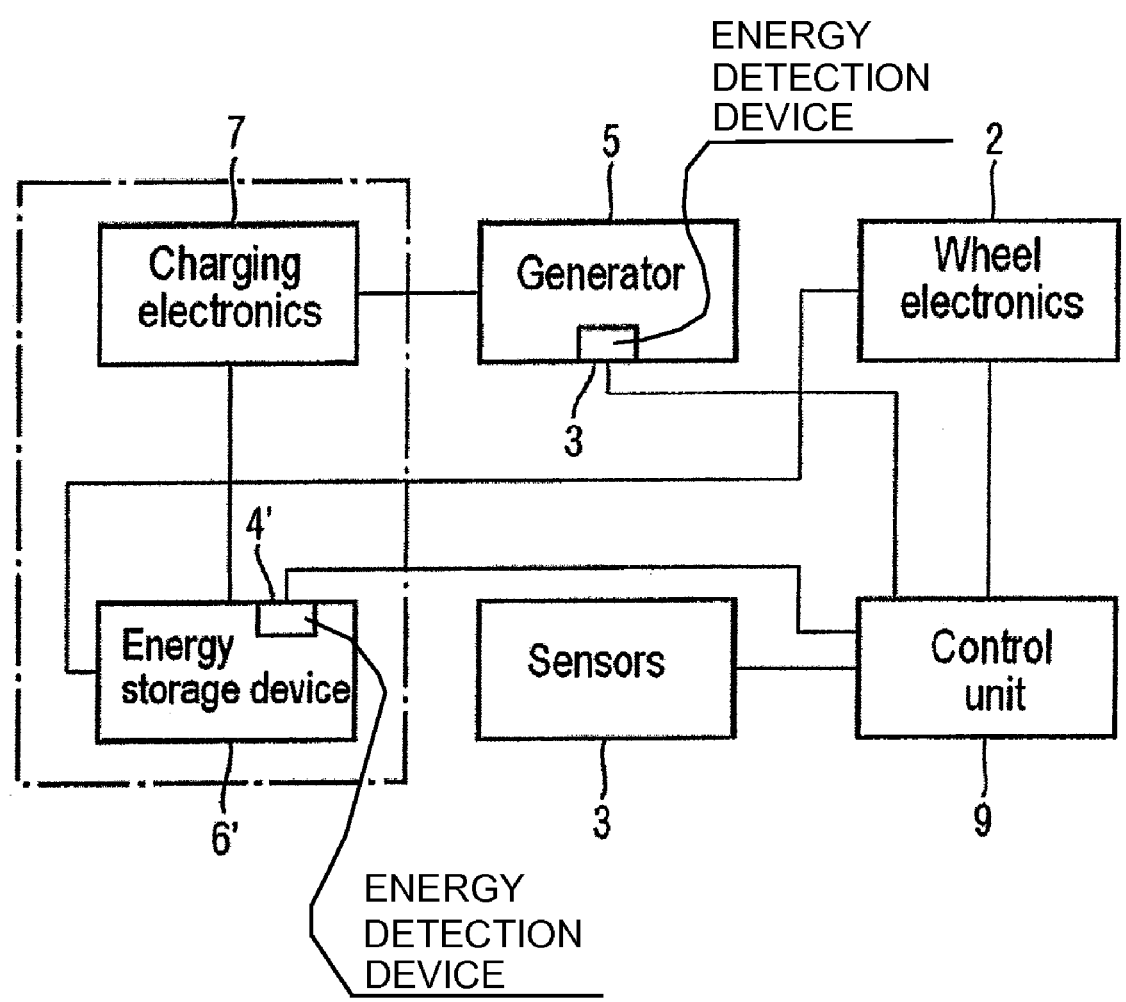
FIG. 2 is a block diagram of the apparatus according to the invention according to a preferred embodiment of the present invention.

FIG. 2 shows a block diagram of the individual components of an apparatus according to the invention according to a preferred embodiment of the present invention. As can be seen in FIG. 2, the central control unit 9, as already explained above, is connected to sensors 3, an energy detection device 4 of the generator 5 and an energy detection device 4' of the interposed energy storage device 6. The central control unit 9 thus registers the instantaneously available energy of the generator 5 and of the interposed energy storage device 6 as well as the instantaneous operating state of the wheel by analyzing the data received by the individual devices 3, 4 and 4'.

As is also illustrated in FIG. 2, the central control unit 9 is connected to the electronic wheel unit 2 or the wheel electronics 2 e.g. via a radio link. The wheel electronics 2 are in turn connected, for energy feeding of same, to the generator 5 via the energy storage device 6. The energy storage device 6 preferably has charging electronics 7 which convert the signals received from the energy-generating generator 5 in a suitable manner and condition them for direct use for the energy storage device 6.

The central control unit 9 generates from one or more signals of one or more sensors 3 an associated signal which characterizes the instantaneous operating state of the wheel 1. For example, this resulting signal can represent one or more of the following operating states of the wheel 1: start of driving, e.g. a predetermined time interval after moving off; initialization, whereby an initialization procedure is executed preferably on the vehicle receiver; localization, whereby a localization procedure is executed e.g. likewise on the vehicle receiver; a risk operating state, e.g. for a detected below-threshold pressure and/or a detected above-threshold speed; a dangerous operating state, e.g. for greatly below-threshold pressure or the like. In addition, the data of the energy detection devices 4 and/or 4' can be evaluated separately by the central control unit 9 or in conjunction with the signals of the sensors 3. Thus, for example, a resulting signal indicating e.g. the charging state of the energy system comprising the generator 5 and the energy storage device 6 can also be generated by the central control unit 9. For example, it can be registered by the central control unit 9 that the energy system is in a charging state e.g. in the event of high available energy at the generator output and/or of a low fill level of the energy storage device 6. In addition, the central control unit 9 can if necessary also indicate a discharging state of the energy system by a correspondingly assigned signal if, for example, low available energy is present at the generator output and/or a high fill level of the energy storage device 6 is available.

The control unit 9 transmits the signal characterizing the driving condition of the wheel 1 and the energy state of the energy system to the electronic wheel unit 2 and controls the operation of the electronic wheel unit 2 such that a mode of the electronic wheel unit 2 matched to the detected instantaneous driving condition and the instantaneously available energy is executed.

Accordingly, the operation or mode of the electronic wheel unit 2 is controlled as a function of the signals registered by the central control unit 9 and thus the energy consumption of the wheel electronics 2 is controlled by the central control unit 9 in a cost-effective manner matched to the wheel and energy state. For example, the central control unit 9 suitably adjusts: the transmitting frequency of the wheel electronics depending on the signals detected, i.e. as a function of the driving condition of the wheel 1 and of the energy reservoir available from the energy system; the measuring frequency of the wheel electronics; the repetition frequency of a radio telegram to improve transmission reliability; the precision of the measurements of the wheel electronics; selection as to which measurements are performed by the wheel electronics; a transition to or from a power saving mode of the wheel electronics, connection of the wheel electronics to the energy storage device, or the like.

The central control unit 9 thus influences the response of the electronic wheel unit 2 as a function of the detected signals in order, for example, during particularly important operating states, to ensure operation which at least temporarily consumes more energy than is instantaneously available from the generator 5. During comparatively less important operating states, the functionality is in some cases reduced below the degree available from the available energy of the generator 5 in order to charge or top up the energy storage device 6 to compensate for the energy previously over-consumed or to be over-consumed. Thus even during operating states in which, at the start of driving, for example, insufficient energy can be generated or made available, a reliable functionality matched to the driving condition is guaranteed for the electronic wheel unit 2 without needing to use additional auxiliary batteries.

The central control unit 9 implements, together with the suitably dimensioned energy storage element 6, a situation-dependent response of the electronic wheel unit 2 which eliminates the limited availability of known generators. Increasing the operational readiness of the electronic wheel unit 2 in this way, particularly in the initial driving phase, allows reliable localization and/or initialization of the associated wheels.

Although the present invention has been described above with reference to preferred embodiments, it is not limited thereto but can be modified in a variety of ways.

For example, the electronic wheel unit 2 can be directly connected to the generator 5 to supply it with energy, the energy storage device 6 only being used to supply the electronic wheel unit 2 with energy in the event of particular detected operating states.

I claim:

1. A method for controlling an operation of an electronic wheel unit assigned to a vehicle wheel, which comprises the steps of:

acquiring data relating to an operating state of the vehicle wheel using at least one state detection device;

acquiring data relating to energy instantaneously available to the electronic wheel unit from a generator and from an energy storage device using at least one energy detection device;

controlling the operation of the electronic wheel unit and thereby controlling an energy consumption of the electronic wheel unit in dependence on the data acquired by the at least one state detection device and the at least one energy detection device with a central control unit connected to the at least one state detection device and to the at least one energy detection device; and ensuring a functionality of the electronic wheel unit during predetermined important operating states of the vehicle wheel that at least temporarily consumes more energy than is instantaneously available from the generator; and reducing the functionality of the electronic wheel unit during predetermined less important operating states of the vehicle wheel to a degree that the energy available from the generator is greater than the energy consumed by the electronic wheel unit, resulting in the generator charging up the energy storage device to compensate for energy previously over-consumed or to be over-consumed.

2. The method according to claim 1, which further comprises directly connecting the electronic wheel unit to the energy storage device for supplying it with energy.

3. The method according to claim 1, which further comprises disposing the energy storage device between the generator and the electronic wheel unit.

4. The method according to claim 1, which further comprises forming the energy storage device with charging electronics for suitable conversion and conditioning of signals received from the generator.

5. The method according to claim 1, which further comprises forming the energy storage device as a device selected from the group consisting of a rechargeable battery, a capacitor, a gold cap capacitor, and a foil battery incorporated in a circuit board.

6. The method according to claim 1, which further comprises providing a plurality of state detection devices for acquiring the data including acceleration data, vibration data, noise data, force data, movement data, temperature data, and pressure data associated with the vehicle wheel.

7. The method according to claim 6, which further comprises providing a plurality of energy detection devices for detecting instantaneously available energy of the generator and an instantaneous utilization state of the energy storage device.

8. The method according to claim 1, which further comprises:
receiving and evaluating the data from the at least one state detection device and/or the at least one energy detection device;
the data from the at least one state detection device and/or the at least one enemy detection device, relating to:
a start of driving state beginning at a defined time interval after moving off;
an initialization state, whereby an initialization procedure is executed on a vehicle receiver;
a localization state, whereby a localization procedure is executed on the vehicle receiver;
a risk state including a below-threshold pressure and/or an above-threshold speed of the vehicle wheel;
a danger state including a below-threshold pressure of the vehicle wheel; and
a charging state including a high available energy state at an output of the generator and a low fill level of the energy storage device state.

9. The method according to claim 1, wherein, in dependence on the data acquired, the central control unit controls:
a transmitting frequency of the electronic wheel unit;
a measurement frequency of the electronic wheel unit;
a repetition frequency of a radio telegram to improve transmission reliability;
an accuracy of measurements of the electronic wheel unit;
a selection of which measurements are to be performed by the electronic wheel unit;
a transition to or from a power saving mode of the electronic wheel unit;
a connection of the electronic wheel unit to the energy storage device;
an adaptation or selection of the transmitted data, including a reduction of the telegram to a most necessary core data for energy saving including only identifiers, pressure data and temperature data; and
a transmission of all data including calibration and manufacturing data in a mode where there is not a need to save energy.

10. The method according to claim 1, which further comprises connecting the central control unit to the electronic wheel unit via a radio link.

11. The method according to claim 7, which further comprises forming the plurality of state detection devices and/or the plurality of energy detection devices as passively operated sensors.

12. The method according to claim 1, which further comprises forming the generator as an energy transducer.

13. An apparatus for controlling an operation of an electronic wheel unit assigned to a vehicle wheel, the apparatus comprising:
a generator;
an energy storage device connected to said generator;
at least one state detection device for acquiring data relating to an operating state of the vehicle wheel;
at least one energy detection device for acquiring data relating to energy instantaneously available to the electronic wheel unit from said generator and from said energy storage device;
a central control unit connected to said at least one state detection device and to said at least one energy detection device for controlling the operation of the electronic wheel unit and for controlling a determined energy consumption of the electronic wheel unit in dependence on the data acquired by said at least one state detection device and said at least one energy detection device;
said central control unit ensuring a functionality of the electronic wheel unit during predetermined important operating states of the vehicle wheel which at least temporarily consume more energy than is instantaneously available from said generator and, said central control unit, during predetermined less important operating states of the vehicle wheel, reduces the functionality of the electronic wheel unit to consume less energy than the energy available from said generator resulting in said generator charging up said energy storage device to compensate for the energy previously over-consumed or to be over-consumed.

14. The apparatus according to claim 13, wherein the electronic wheel unit is connected directly to said energy storage device for supplying energy.

15. The apparatus according to claim 13, wherein said energy storage device is disposed between said generator and the electronic wheel unit.

16. The apparatus according to claim 13, wherein said energy storage device includes charging electronics for appropriate conversion and conditioning of signals received from said generator.

17. The apparatus according to claim 13, wherein said energy storage device is selected from the group consisting of a rechargeable battery, a capacitor, a gold cap capacitor, and a foil battery incorporated in a circuit board.

18. The apparatus according to claim 13, wherein said state detection device is one of a plurality of state detection devices for acquiring data in respect of accelerations, vibrations, noise, forces, movements, temperatures, and pressures of the vehicle wheel.

19. The apparatus according to claim 18, wherein said energy detection device is one of a plurality of energy detection devices for detecting an instantaneously available energy of said generator and an instantaneous utilization state of said energy storage device.

20. The apparatus according to claim 13, wherein:
said central control unit receives and evaluates the data acquired by said at least one state detection device and/or said at least one energy detection; and
the data, which is acquired by said at least one state detection device and/or said at least one enemy detection device, relate to:
 a start of a driving state beginning at a defined time interval after moving off;
 an initialization state, whereby an initialization procedure is executed on a vehicle receiver;
 a localization state, whereby a localization procedure is executed on the vehicle receiver;
 a risk state for a below-threshold pressure and/or an above-threshold speed of a wheel;
 a danger state for a greatly below-threshold pressure of the vehicle wheel; and
 a charging state including a determination of a high available energy state at an output of said generator and/or a low fill level of said energy storage device state.

21. The apparatus according to claim 13, wherein, in dependence on the data acquired by said at least one state detection device and/or said at least one enemy detection device, said central control unit is programmed to control:
 a transmitting frequency of the electronic wheel unit;
 a measurement frequency of the electronic wheel unit;
 a repetition frequency of a radio telegram to improve transmission reliability;
 an accuracy of measurements of the electronic wheel unit;
 a selection of which measurements are to be performed by the electronic wheel unit;
 a transition to or from a power saving mode of the electronic wheel unit;
 a connection of the electronic wheel unit to said energy storage device;
 an adaptation or selection of the transmitted data including reducing the telegram to a most necessary core data for energy saving, the core data including only identifiers, pressure data and temperature data; and
 a transmission of all data including calibration and manufacturing data in a mode where there is not a need to save energy.

22. The apparatus according to claim 13, further comprising a radio link, said central control unit connected to the electronic wheel unit via said radio link.

23. The apparatus according to claim 19, wherein said plurality of state detection devices and/or said plurality of energy detection devices are passively operated sensors.

24. The apparatus according to claim 13, wherein said generator is an energy transducer.

* * * * *